(12) United States Patent
Bates

(10) Patent No.: US 6,289,034 B1
(45) Date of Patent: Sep. 11, 2001

(54) PROCESS AND AN APPARATUS FOR PRODUCING METALS AND METAL ALLOYS

(75) Inventor: Cecil Peter Bates, Mt. Pleasant (AU)

(73) Assignee: Technologies Resources Pty. Ltd., Melbourne (AU)

(*) Notice: Subject to any disclaimer, the term of this patent is extended or adjusted under 35 U.S.C. 154(b) by 0 days.

(21) Appl. No.: 09/509,314
(22) PCT Filed: Aug. 30, 1999
(86) PCT No.: PCT/AU99/00699
§ 371 Date: Mar. 21, 2000
§ 102(e) Date: Mar. 21, 2000
(87) PCT Pub. No.: WO00/12766
PCT Pub. Date: Mar. 9, 2000

(30) Foreign Application Priority Data

Aug. 28, 1998 (AU) .................................... PP5540

(51) Int. Cl.$^7$ ......................................................... H05B 7/18
(52) U.S. Cl. ................................. 373/60; 373/63; 373/85; 75/500; 266/236
(58) Field of Search ................................. 373/1, 8, 42, 60, 373/66, 85, 72, 2, 9; 75/500, 501, 502, 707, 453, 10.65; 266/236

(56) References Cited

U.S. PATENT DOCUMENTS

| Re. 33,464 | 11/1990 | Gitman . |
|---|---|---|
| 2,647,045 | 7/1953 | Rummel . |
| 3,844,770 | 10/1974 | Nixon . |

(List continued on next page.)

FOREIGN PATENT DOCUMENTS

| A-23864/84 | 1/1984 | (AU) . |
|---|---|---|
| B-41064/85 | 4/1986 | (AU) . |
| B-69707/87 | 9/1987 | (AU) . |

(List continued on next page.)

OTHER PUBLICATIONS

Patent Abstract of Japan, JP, A, 10–280020 (Nippon Steel Corp.), Oct. 20, 1998.
Patent Abstracts of Japan, C–951, p. 24, JP, A, 04–63218 (Kawasaki Heavy Ind. Ltd), Feb. 28, 1992.
Patent Abstracts of Japan, C–627, p. 109, Jp, A, 01–127613 (Kawasaki Steel Corp.), May 19, 1989.
WPAT print–out for Brazilian patent application PI9400123–5 (Weber).

(List continued on next page.)

Primary Examiner—Tu Ba Hoang
(74) Attorney, Agent, or Firm—Merchant & Gould P.C.

(57) ABSTRACT

A process for producing metals from a metalliferous feed material in an electric furnace is disclosed. The process includes the steps of forming a molten bath having a metal layer and a slag layer on the metal layer in the furnace and supplying electrical energy to the furnace and converting the electrical energy to thermal energy and thereby contributing to the heat input requirements of the process. The process also includes injecting a carrier gas and a solid carbonaceous material into the molten bath via one or more than one solids injection lance/tuyere and causing molten material to be projected from the molten bath as splashes, droplets, and streams into a space above a nominal quiescent surface of the molten bath and forming a transition zone. The process also includes injecting an oxygen-containing gas into the furnace via one or more than one oxygen-containing gas injection lance/tuyere and post-combusting reaction gases released from the molten bath and thereby further contributing to the heat requirements of the process. In this process the ascending and thereafter descending splashes, droplets, and streams of molten material in the transition zone facilitate heat transfer to the molten bath and the transition zone minimises heat loss from the furnace via the side walls in contact with the transition zone.

10 Claims, 1 Drawing Sheet

U.S. PATENT DOCUMENTS

| | | |
|---|---|---|
| 3,845,190 | 10/1974 | Yosim et al. . |
| 3,888,194 | 6/1975 | Kishigami et al. . |
| 3,890,908 | 6/1975 | von Klenck et al. . |
| 3,894,497 | 7/1975 | Helke et al. . |
| 4,007,034 | 2/1977 | Hartwig et al. . |
| 4,053,301 | 10/1977 | Stephens, Jr. . |
| 4,083,715 | 4/1978 | Langhammer . |
| 4,145,396 | 3/1979 | Grantham . |
| 4,177,063 | 12/1979 | Dickson . |
| 4,207,060 | 6/1980 | Zangs . |
| 4,356,035 | 10/1982 | Brotzmann et al. . |
| 4,389,043 | 6/1983 | Weber et al. . |
| 4,400,936 | 8/1983 | Evans . |
| 4,402,274 | 9/1983 | Meenan et al. . |
| 4,431,612 | 2/1984 | Bell et al. . |
| 4,447,262 | 5/1984 | Gay et al. . |
| 4,455,017 | 6/1984 | Wunsche . |
| 4,468,298 | 8/1984 | Byrne et al. . |
| 4,468,299 | 8/1984 | Byrne et al. . |
| 4,468,300 | 8/1984 | Byrne et al. . |
| 4,481,891 | 11/1984 | Takeshita et al. . |
| 4,504,043 | 3/1985 | Yamaoka et al. . |
| 4,511,396 | 4/1985 | Nixon . |
| 4,521,890 | 6/1985 | Burnham et al. . |
| 4,565,574 | 1/1986 | Katayama et al. . |
| 4,566,904 | 1/1986 | von Bogdandy et al. . |
| 4,572,482 | 2/1986 | Bedell . |
| 4,574,714 | 3/1986 | Bach et al. . |
| 4,602,574 | 7/1986 | Bach et al. . |
| 4,664,618 | 5/1987 | Gitman . |
| 4,681,599 | 7/1987 | Obkircher . |
| 4,684,448 | 8/1987 | Itoh et al. . |
| 4,701,214 | 10/1987 | Kaneko et al. . |
| 4,718,643 | 1/1988 | Gitman . |
| 4,786,321 | 11/1988 | Hoster et al. . |
| 4,790,516 | 12/1988 | Sugiura et al. . |
| 4,798,624 | 1/1989 | Brotzmann et al. . |
| 4,804,408 | 2/1989 | Fuhringer et al. . |
| 4,836,847 | 6/1989 | Bishop et al. . |
| 4,849,015 | 7/1989 | Fassbinder et al. . |
| 4,861,368 | 8/1989 | Brotzmann et al. . |
| 4,874,427 | 10/1989 | Hamada et al. . |
| 4,890,562 | 1/1990 | Gitman . |
| 4,913,734 | 4/1990 | Romenets et al. . |
| 4,923,391 | 5/1990 | Gitman . |
| 4,940,488 | 7/1990 | Maeda et al. . |
| 4,946,498 | 8/1990 | Weber . |
| 4,976,776 | 12/1990 | Elvander et al. . |
| 4,999,097 | 3/1991 | Sadoway . |
| 5,005,493 | 4/1991 | Gitman . |
| 5,024,737 | 6/1991 | Claus et al. . |
| 5,037,608 | 8/1991 | Tarcy et al. . |
| 5,042,964 | 8/1991 | Gitman . |
| 5,050,848 | 9/1991 | Hardie et al. . |
| 5,051,127 | 9/1991 | Hardie et al. . |
| 5,065,985 | 11/1991 | Takahashi et al. . |
| 5,177,304 | 1/1993 | Nagel . |
| 5,191,154 | 3/1993 | Nagel . |
| 5,222,448 | 6/1993 | Morgenthaler et al. . |
| 5,238,646 | 8/1993 | Tarcy et al. . |
| 5,271,341 | 12/1993 | Wagner . |
| 5,279,715 | 1/1994 | La Camera et al. . |
| 5,301,620 | 4/1994 | Nagel et al. . |
| 5,302,184 | 4/1994 | Batterham et al. . |
| 5,322,547 | 6/1994 | Nagel et al. . |
| 5,332,199 | 7/1994 | Knapp et al. . |
| 5,333,558 | 8/1994 | Lees, Jr. . |
| 5,396,850 | 3/1995 | Conochie et al. . |
| 5,401,295 | 3/1995 | Brotzmann . |
| 5,407,461 | 4/1995 | Hardie et al. . |
| 5,415,742 | 5/1995 | La Camera et al. . |
| 5,443,572 | 8/1995 | Wilkison et al. . |
| 5,444,733 * | 8/1995 | Coassin et al. ................... 373/72 |
| 5,480,473 | 1/1996 | Hardie et al. . |
| 5,489,325 | 2/1996 | Keogh et al. . |
| 5,498,277 | 3/1996 | Floyd et al. . |
| 5,518,523 | 5/1996 | Brotzmann . |
| 5,529,599 | 6/1996 | Calderon . |
| 5,613,997 | 3/1997 | Satchell, Jr. . |
| 5,630,862 | 5/1997 | Greenwalt . |
| 5,640,708 | 6/1997 | Conochie et al. . |
| 5,647,888 | 7/1997 | Keogh et al. . |
| 5,683,489 | 11/1997 | Hayashi et al. . |
| 5,741,349 | 4/1998 | Hubble et al. . |
| 5,800,592 | 9/1998 | den Hartog et al. . |
| 5,802,097 | 9/1998 | Gensini et al. . |
| 5,869,018 | 2/1999 | Stephens, Jr. . |
| 5,871,560 | 2/1999 | Fluch et al. . |
| 5,938,815 | 8/1999 | Satchell, Jr. . |
| 6,083,296 * | 7/2000 | Innes et al. ....................... 75/502 |
| 6,143,054 | 11/2000 | Dry . |
| B1 4,940,488 | 8/1999 | Maeda et al. . |

FOREIGN PATENT DOCUMENTS

| | | |
|---|---|---|
| B-22448/88 | 5/1989 | (AU) . |
| B-26831/88 | 7/1989 | (AU) . |
| B-28802/89 | 8/1989 | (AU) . |
| A-42859/89 | 4/1990 | (AU) . |
| A-49307/90 | 9/1990 | (AU) . |
| A-49309.90 | 9/1990 | (AU) . |
| B-74840/91 | 10/1991 | (AU) . |
| B-90957/91 | 8/1992 | (AU) . |
| A-48938/93 | 4/1994 | (AU) . |
| B-48937/93 | 5/1994 | (AU) . |
| B-50820/96 | 1/1997 | (AU) . |
| 3139375 | 4/1983 | (DE) . |
| 3244744 | 5/1984 | (DE) . |
| 079 182 A1 | 5/1983 | (EP) . |
| 084 288 A1 | 7/1983 | (EP) . |
| 422 309 A1 | 4/1991 | (EP) . |
| 541 269 A1 | 5/1993 | (EP) . |
| 592 830 A1 | 4/1994 | (EP) . |
| 657 550 | 6/1995 | (EP) . |
| 2 043 696 A | 10/1980 | (GB) . |
| 2 088 892 A | 6/1982 | (GB) . |
| 59-159944 | 9/1984 | (JP) . |
| 10-219343 | 8/1998 | (JP) . |
| WO 89/01981 | 3/1989 | (WO) . |
| WO 92/12265 | 7/1992 | (WO) . |
| WO 93/06251 | 4/1993 | (WO) . |
| WO 94/19497 | 9/1994 | (WO) . |
| WO 96/19591 | 6/1996 | (WO) . |
| WO 96/31627 | 10/1996 | (WO) . |
| WO 97/17473 | 5/1997 | (WO) . |
| WO 97/20958 | 6/1997 | (WO) . |
| WO 97/23656 | 7/1997 | (WO) . |
| WO 98/27232 | 6/1998 | (WO) . |
| WO 98/27239 | 6/1998 | (WO) . |
| WO 99/16911 | 4/1999 | (WO) . |

OTHER PUBLICATIONS

Patent Abstracts of Japan, C–951, JP, A, 4–63217 (Kawasaki Heavy Ind. Ltd.), Feb. 28, 1992.

Patent abstracts of Japan, C–497, p. 115, JP, A, 62–280315 (Nippon Kokan K.K), Dec. 15, 1987.

Derwent Abstract Accession No. 87–039748/06 Class Q77, JP, A, 61–295334, Dec. 26, 1986.

* cited by examiner

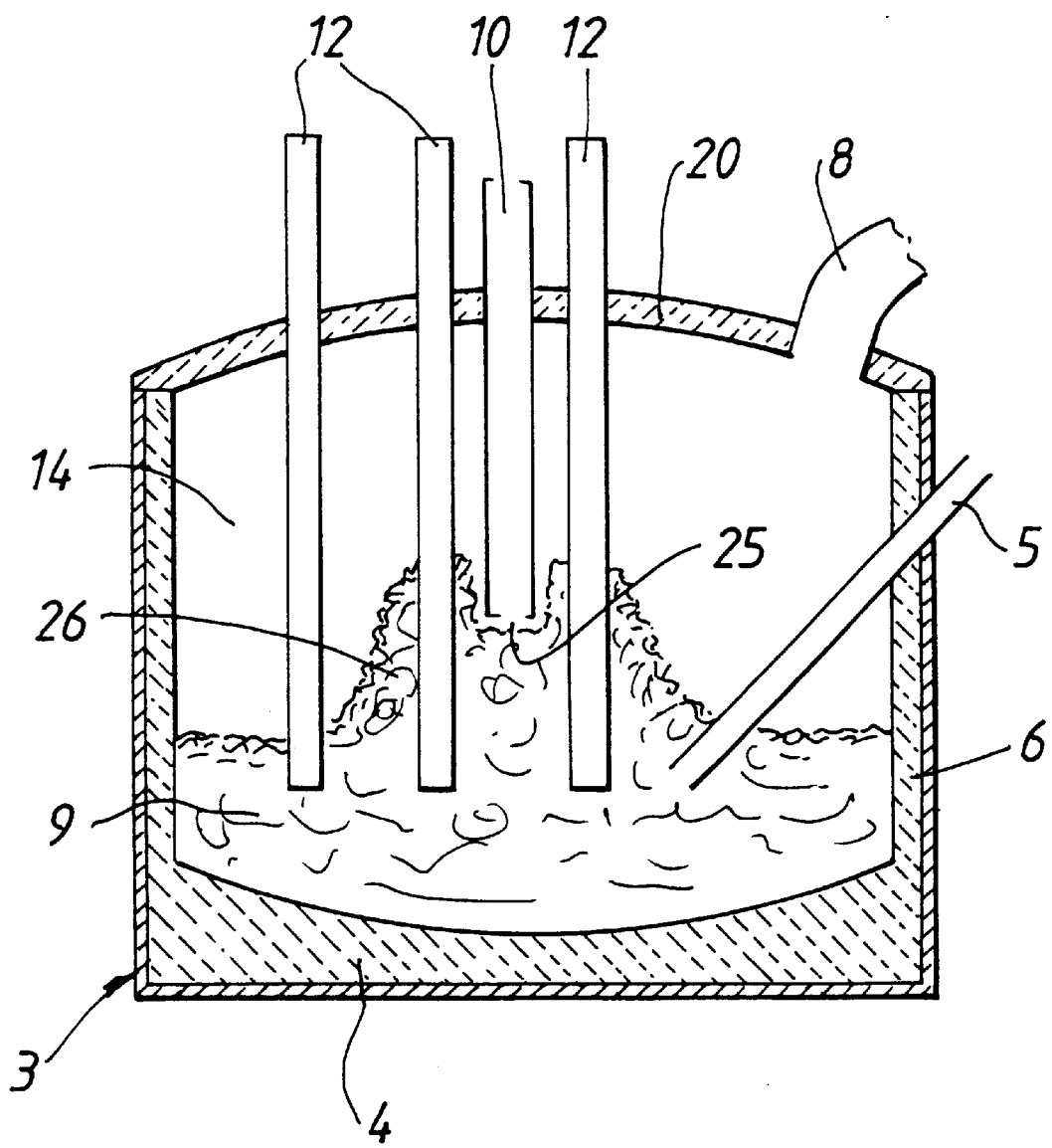

PROCESS AND AN APPARATUS FOR PRODUCING METALS AND METAL ALLOYS

FIELD OF THE INVENTION

The present invention relates to a method and to an apparatus for producing molten metal (which term includes metal alloys) from a metalliferous feed using electrical energy.

The present invention relates particularly, although by no means exclusively, to producing iron, steel, and ferroalloys in an electric furnace.

The term "electric furnace" is understood herein to cover any furnace that relies wholly or partly on electric current for heating a metal containing metalliferous charge.

By way of example, the term "electric furnace" covers conventional a/c and d/c arc furnaces commonly used in steelmaking, submerged arc furnaces commonly use in the production of ferroalloys and pig iron, and induction furnaces commonly used for melting scrap.

SUMMARY OF THE INVENTION

An object of the present invention is to provide an improved process and apparatus for producing molten metal from a metalliferous feed in an electrical furnace.

According to the present invention there is provided a process for producing metals from a metalliferous feed material in an electric furnace, which process includes the steps of:

(a) forming a molten bath having a metal layer and a slag layer on the metal layer in the furnace;

(b) supplying electrical energy to the furnace and converting the electrical energy to thermal energy and thereby contributing to the heat input requirements of the process;

(c) injecting a carrier gas and a solid carbonaceous material into the molten bath via one or more than one lance/tuyere;

(d) causing molten material to be projected from the molten bath as splashes, droplets, and streams into a space above a nominal quiescent surface of the molten bath and forming a transition zone; and (e) injecting an oxygen-containing gas into the furnace via one or more than one lance/tuyere and post-combusting reaction gases released from the molten bath and thereby further contributing to the heat requirements of the process.

The term "metal layer" is understood herein to mean that region of the bath that is predominantly metal.

The term "slag layer" is understood herein to mean that region of the bath that is predominantly slag.

The term "transition zone" is understood herein to mean a zone above the nominal quiescent surface of the molten bath in which there are ascending and thereafter descending droplets or splashes of molten material.

The term "quiescent surface" in the context of the molten bath is understood herein to mean the surface of the molten bath under process conditions in which there is no gas/solids injection and therefore no bath agitation.

Step (a) of forming a molten bath may include supplying an initial solid charge of the metalliferous feed material to the furnace and melting at least part of the charge by means of thermal energy generated from electrical energy supplied to the furnace.

Alternatively, step (a) may include supplying the metalliferous feed material to the furnace in a molten form and thereby forming the molten bath.

In either situation described in the preceding two paragraphs, the process may include adding further metalliferous feed material to the furnace at a later stage in the process.

The transition zone is an effective region for post combustion of reaction gases. In addition, the movement of droplets, splashes, and streams of molten material between the bath and the transition zone is an effective means of transferring to the molten bath the heat generated by post combustion of reaction gases. Furthermore, the molten material, and particularly the slag, in the transition zone is an effective means of minimising heat loss by radiation via the side wall of the furnace in contact with the transition zone.

The transition zone is quite different to the slag layer. By way of explanation, under stable operating conditions of the process, the slag layer comprises gas bubbles in a liquid continuous volume whereas the transition zone comprises splashes, droplets, and streams of molten material in a gas continuous phase. More particularly, the transition zone is a non-foaming slag environment and, therefore, is quite different to the zone that is generated in conventional arc furnaces as a consequence of carbon boil and foaming slag practices in these furnaces.

In a situation where the electric furnace includes electrodes extending into the furnace for supplying electrical energy to the furnace, it is preferred that the process includes forming a protective layer of molten material on the electrodes.

It is preferred particularly that the splashes, droplets and streams of molten material projected from the molten bath in step (d) forms the protective coating.

The reaction gases released from the molten bath may include any suitable combustible gases, such as CO and $H_2$.

Post-combusting reaction gases and transferring energy to the bath in accordance with the present invention contributes to the thermal energy requirements of the process and thereby reduces the electrical energy requirements of the furnace.

Preferably the level of post-combustion is at least 40%, more preferably at least 60%, where post-combustion is defined as:

$$\frac{[CO_2] + [H_2O]}{[CO_2] + [H_2O] + [CO] + [H_2]}$$

where:

[$CO_2$]=volume % of $CO_2$ in off-gas
[$H_2O$]=volume % of $H_2O$ in off-gas
[$CO$]=volume % of CO in off-gas
[$H_2$]=volume % of $H_2$ in off-gas The injection of the carrier gas and the solid carbonaceous material into the molten bath and the injection of oxygen-containing gas into the furnace in accordance with the present invention causes mixing of constituents in the molten bath and in the transition zone and other sections of the gas space above the molten bath which promotes the chemical reactions required by the process.

Depending on the end product to be produced by the process, other solid materials may be injected into the molten bath with the solid carbonaceous material.

By way of example, when the process is concerned with producing iron, metalliferous feed material in the form of iron ore and/or partially reduced iron ore, slag forming agents, and fluxes may be injected with the carrier gas and the solid carbonaceous material into the molten bath.

By way of further example, when the process is concerned with producing steel, metalliferous feed material in the form of scrap steel, pig iron, steel plant wastes, and other iron-containing sources, slag forming agents, and fluxes may be injected with the carrier gas and the solid carbonaceous material into the molten bath.

By way of particular example, when the process is concerned with producing steel from iron ore and/or partially reduced iron ore, the final stages of the process may include stopping injection of the solid carbonaceous material into the molten bath to facilitate adjustment of the carbon concentration of the molten bath to that for a required steel composition.

It is preferred that the carrier gas and the solid carbonaceous material and optionally other solid materials be injected into the metal layer of the molten bath.

It is preferred particularly that the transition zone be formed by injecting the carrier gas and the solid carbonaceous material and optionally other solid materials into the molten bath through one or more than one lance/tuyere positioned above and extending downwardly towards the metal layer of the molten bath.

It is preferred that the one or more than one lance/tuyere be at an angle of between 10 and 70° to the vertical.

It is preferred particularly that the angle be between 20 and 60°.

It is preferred that the lances/tuyeres be retractable.

It is preferred that the injection of the carrier gas and the solid carbonaceous material and optionally other solid materials into the molten bath be sufficient to cause molten material to be projected into the space above the bath in a fountain-like manner.

The metalliferous feed material may be in any suitable form, such as lump pellets, and fines.

The metalliferous feed material may be preheated.

The carrier gas may be any suitable carrier gas.

It is preferred that the carrier gas be an oxygen-deficient gas.

It is preferred that the carrier gas comprise nitrogen.

The oxygen-containing gas may be any suitable gas.

By way of example, when the process is concerned with producing iron from iron ore and/or partially reduced iron ore, the oxygen-containing gas may be air or oxygen-enriched air.

In this situation, it is preferred particularly that the air be preheated.

Preferably the location and operating parameters of the one or more than one lance/tuyere that injects the oxygen-containing gas and the operating parameters that control the transition zone are selected so that:

(a) the oxygen-containing gas is injected towards and penetrates the transition zone;

(b) the stream of oxygen-containing gas deflects the splashes, droplets, and streams of molten material so that, in effect:

(i) the transition zone extends upwardly around the lower section of the or one or more than one lance/tuyere; and (ii) a gas continuous space described as a "free space" forms around the end of the one or more than one lance/tuyere.

The formation of the free space is an important feature because it makes it possible for reaction gases in the top space of the furnace to be drawn into the region of the end of the one or more than one lance/tuyere and to be post-combusted in the region. In this context, the term "free space" is understood to mean a space which contains practically no metal and slag.

According to the present invention there is also provided an electric furnace for producing metals and metal alloys from a metalliferous feed which includes:

(a) a means which injects a carrier gas and a solid carbonaceous material into a molten bath of metal and slag in the furnace from above the molten bath and/or through a section of a side of the furnace that is in contact with the molten bath and causes the solid material to penetrate the molten bath and thereby causes directly or indirectly molten material(which includes metal and/or slag) to be projected into a space above a quiescent surface of the molten bath to form a transition zone; and (b) a means which injects an oxygen-containing gas into the space above the molten bath surface and post combusts reaction gases released from the molten bath.

BRIEF DESCRIPTION OF THE DRAWINGS(S)

The present invention is described further by way of example with reference to the accompanying drawing which is a vertical section through a preferred embodiment of an electrical furnace in accordance with the present invention for carrying out a preferred embodiment of the process in accordance with the present invention.

DETAILED DESCRIPTION OF THE PREFERRED EMBODIMENT

The following description is in the context of smelting iron ore to produce molten iron. It is understood that the present invention is not limited to this application and is applicable generally to producing metals and metal alloys, such as steel and ferroalloys, from metalliferous feeds.

The furnace shown in the FIGURE is an A/C direct arc furnace with 3 electrodes 12 extending downwardly into the furnace. The electrodes 12 are connected to a source of alternating current (not shown).

At start-up of the process an initial charge of iron ore and/or partially reduced iron ore, a solid carbonaceous material such as coal, slag forming agents, and fluxes is supplied to the furnace. The amount of the charge and the position of the electrodes 12 are selected so that the tips of the electrodes 12 are immersed in the charge. The furnace is operated so that arcs are generated between the electrodes 12 and the charge. The upper part of the charge may include a suitable high electrical conductivity material to facilitate the striking and establishment of stable arcs.

The arcs produce substantial thermal energy which smelts the charge and produces and thereafter maintains a molten bath 9 shown in the FIGURE. The molten bath includes a metal layer (not shown) and a slag layer (not shown) on the metal layer.

The iron ore in the charge, and iron ore that is subsequently added to the furnace, progressively smelts and produces molten iron which forms part of the molten bath. The molten iron is periodically tapped from the furnace.

The carbonaceous material in the metal charge, and carbonaceous material that is subsequently added to the furnace 3, acts as a reductant and an energy source.

The furnace comprises a metal shell and a lining of refractory material and water-cooled panelling which is adapted to retain the metal charge—including the molten bath. The furnace comprises a base 4, a cylindrical side wall 6, a roof 20, and an off-gas outlet 8. The water-cooled panelling may be of any suitable configuration. For example, the water-cooled panelling may be of the type described in International application PCT/AU99/00537 of the applicant.

The furnace further comprises a single lance/tuyere 5 extending through the side wall 6 into the furnace to a position at which, in use, the open end of the lance/tuyere 5 is a short distance above the nominal quiescent surface of the metal layer in the molten bath 9. The lance/tuyere 5 is angled downwardly towards the surface of the molten bath 9 at an angle of between 10 and 70° to the vertical.

The furnace further comprises a retractable lance/tuyere 10 extending generally vertically into the furnace through the roof 20.

In use, after the start-up stage of the process has established the molten bath 9, carbonaceous material and iron ore and/or partially reduced iron ore that are required to continue the process are entrained in nitrogen (or any other suitable carrier gas) and are injected through the lance/tuyere 5 into the metal layer of the molten bath 9 via the lance/tuyere 5. The momentum of the solid material/carrier gas causes the solid material and gas to penetrate the metal layer. The coal is devolatilised and thereby produces gas in the metal layer. Carbon partially dissolves into the metal and partially remains as solid carbon. The iron ore is smelted to metal and the smelting reaction generates carbon monoxide gas. The gases that are transported into the metal layer and generated via devolatilisation and smelting produce significant buoyancy uplift of molten metal, solid carbon, and slag (drawn into the metal layer as a consequence of solid/gas injection) from the metal layer which generates an upward movement of splashes, droplets and streams of molten metal and slag. These splashes, droplets and streams entrain slag as they move through the slag layer of the molten bath.

The buoyancy uplift of molten metal, solid carbon and slag causes substantial agitation in the metal layer and the slag layer, with the result that the slag layer expands in volume. The extent of agitation is such that there is reasonably uniform temperature in these regions—typically, 1450–1550° C. with a temperature variation of the order of 30° in each region.

In addition, the upward movement of splashes, droplets and streams of molten metal and slag caused by the buoyancy uplift of molten metal, solid carbon, and slag extends into the top space 14 above the molten bath 9 and forms a transition zone 26.

In general terms, the slag layer is a liquid continuous volume, with gas bubbles therein, and the transition zone is a gas continuous volume with splashes, droplets and streams of molten metal and slag.

A suitable oxygen-containing gas, such as hot air or oxygen-enriched air, is injected via the top lance/tuyere 10 into the furnace. The position of the lance/tuyere 10 and the gas flow rate through the lance/tuyere 10 are selected so that the oxygen-containing gas penetrates the central region of the transition zone 26 and maintains an essentially metal/slag free space 25 around the end of the lance 10.

The injection of the oxygen-containing gas via the lance/tuyere 10 post-combusts reaction gases CO and $H_2$ in the transition zone 26 and in the free space 25 around the end of the lance 10 and generates high temperatures of the order of 2000° C. or higher in the gas space. The heat is transferred to the ascending and descending splashes droplets, and streams of molten material in the region of gas injection and the heat is then partially transferred to the metal layer when the metal/slag returns to the metal layer.

The free space 25 is important to achieving high levels of post combustion (ie more than 40%) because it enables entrainment of gases in the space above the transition zone 26 into the end region of the lance/tuyere 10 and thereby increases exposure of available reaction gases to post combustion.

The combined effect of the position of the lance/tuyere 10, gas flow rate through the lance/tuyere 10, and upward movement of splashes, droplets and streams of molten metal and slag is to shape the transition zone 26 around the lower region of the lance/tuyere 10. This shaped region provides a partial barrier to heat transfer by radiation to the side wall 6.

Moreover, the ascending and descending droplets, splashes and streams of metal and slag is an effective means of transferring heat from the transition zone 26 to the molten bath with the result that the temperature of the transition zone 26 in the region of the side wall 6 is of the order of the bath temperature.

The purpose of oxygen-containing gas injection via the lance/tuyere 10 is to post-combust reaction gases, such as CO and $H_2$, that are released from the molten bath 9 into the space 14 and otherwise would be discharged from the furnace via the gas outlet 8 to a primary post-combustion of greater than 40%.

The thermal energy generated by the post combustion reactions is transferred to the molten material in the transition zone 26 and, thereafter, is transferred to the molten bath 9 when the splashes, streams and droplets of molten bath material return to the molten bath 9.

The thermal energy transferred to the molten bath 9 as a consequence of post combustion reaction gases reduces the electrical energy requirements of the process.

Many modifications may be made to the preferred embodiments of the method and apparatus of the present invention described above without departing from the spirit and scope of the present invention.

By way of example, whilst the preferred embodiment includes a lance/tuyere 10 which extends vertically through the roof 20, the present invention is not so limited and includes one or more than one lance/tuyere for injecting oxygen-containing gas extending through the side wall 6 of the furnace.

By way of further example whilst the preferred embodiment is described in the context of smelting iron ore to produce molten iron, the present invention is not limited to this application and is applicable generally to producing metals and metal alloys, such as steel and ferroalloys.

By way of particular example, when the process of the present invention is concerned with producing steel from high iron content feed material, such as HBI, it is preferred that the start-up procedure includes supplying a solid charge of metalliferous feed material to the furnace and partially melting the charge with thermal energy generated by arcs between the electrodes 12 and the solid charge and thereby forming a molten bath. Subsequently, after the molten bath has been established to a sufficient extent, the process includes injecting a carrier gas and a solid carbonaceous material via the lance/tuyere 5 into the molten bath and generating the transition zone and injecting oxygen-containing gas via lance/tuyere 10 into the furnace and post-combusting reaction gases released from the molten bath. The combined effect of heat generated by electrical energy and post combustion melts the remaining solid charge. After the remaining solid charge has been melted, the process includes stopping injection of solid carbonaceous material and thereafter injecting oxygen-containing material (such as iron ore, partially reduced iron ore or oxygen-containing gas) into the molten bath to reduce the level of carbon to that of a required steel composition.

What is claimed is:

1. A process for producing metals from a metalliferous feed material in an electrical furnace, which process includes the steps of:

(a) forming a molten bath having a metal layer and a slag layer on the metal layer in the furnace;

(b) supplying electrical energy to the furnace and converting the electrical energy to thermal energy and thereby contributing to heat input requirements of the process;

(c) injecting a carrier gas and a solid carbonaceous material into the metal layer of the molten bath via one or more than one solids injection lance/tuyere;

(d) causing molten material to be projected from the molten bath as splashes, droplets, and streams into a space above a nominal quiescent surface of the molten bath and forming a transition zone; and (e) injecting an oxygen-containing gas into the furnace via one or more than one gas injection lance/tuyere and post-combusting reaction gases released from the molten bath and thereby further contributing to the heat requirements of the process, with the ascending and thereafter descending splashes, droplets, and streams of molten material in the transition zone facilitating heat transfer to the molten bath, and with the transition zone minimizing heat loss from the furnace via the side walls in contact with the transition zone.

2. The process defined in claim 1 wherein step (a) includes supplying an initial solid charge of the metalliferous feed material to the furnace and melting at least part of the charge by means of thermal energy generated from electrical energy supplied to the furnace.

3. The process defined in claim 1 wherein step (a) includes supplying the metalliferous feed material to the furnace in a molten form and thereby forming the molten bath.

4. The process defined in claim 2 or claim 3 further including adding metalliferous feed material to the furnace at a later stage in the process.

5. The process defined in claim 1 wherein step (c) includes injecting carrier gas and the solid carbonaceous material into the molten bath via the one or more than one solids injection lance/tuyere and thereby causing upward movement of splashes, droplets, and streams of molten material that forms the transition zone.

6. An electrical furnace for producing metals and metal alloys from a metalliferous feed which includes:

(a) electrodes extending into the furnace;

(b) a lance/tuyere extending into the furnace for injecting a carrier gas and a solid carbonaceous material into a molten bath of metal and slag in the furnace so that the solid material penetrates the molten bath and thereby causes directly or indirectly molten material to be projected into a space above a quiescent surface of the molten bath to form a transition zone; and (c) a lance/tuyere extending into the furnace for injecting an oxygen-containing gas into the space above the molten bath surface so as to post combust reaction gases released from the molten bath.

7. The process defined in claim 1 includes injecting other solid materials into the molten bath via the one or more than one solids injection lance/tuyere.

8. The process defined in claim 7 wherein the other solid materials include the metalliferous feed material.

9. The process defined in claim 1, when operated to produce steel from iron ore or partially reduced iron ore, includes stopping or at least substantially limiting injection of the carbonaceous material at a later stage of the process to facilitate adjustment of the carbon concentration of the molten bath to that for a required steel composition.

10. The process defined in claim 1 includes locating the one or more than one gas injection lance/tuyere and injecting the oxygen containing gas so that:

(a) the oxygen-containing gas is injected towards and penetrates the transition zone;

(b) the stream of oxygen-containing gas deflects the splashes, droplets, and streams of molten material so that, in effect:

(i) the transition zone extends upwardly around the lower section of the one or more than one gas injection lance/tuyere; and (ii) a continuous free space of gas forms around the end of the one or more than one gas injection lance/tuyere.

* * * * *